May 23, 1939.　　　F. H. WETMORE　　　2,159,956
AUTOMATIC CLUTCH
Filed July 26, 1937　　　2 Sheets-Sheet 1

INVENTOR.
Foster H. Wetmore
BY *Lancaster, Allwine Rommel*
ATTORNEYS.

May 23, 1939.  F. H. WETMORE  2,159,956
AUTOMATIC CLUTCH
Filed July 26, 1937  2 Sheets-Sheet 2

INVENTOR.
Foster H. Wetmore
BY Lancaster, Allwine & Rommel
ATTORNEYS.

Patented May 23, 1939

2,159,956

UNITED STATES PATENT OFFICE 2,159,956

AUTOMATIC CLUTCH

Foster H. Wetmore, Detroit, Mich.; Roy E. Brainerd, Detroit, Mich., administrator of Foster H. Wetmore, deceased, assignor to Mary H. Wetmore, Detroit, Mich.

Application July 26, 1937, Serial No. 155,831

6 Claims. (Cl. 242—84.7)

The present invention relates to improvements in automatic clutches particularly well adapted for use in conjunction with free spool fishing reels, and an important object of the invention is to provide an improved clutch for a free spool fishing reel which automatically engages when the reel shaft is turned in one direction and releases when the shaft is stationary or turned in the opposite direction.

Another object of the invention is to provide an improved free spool fishing reel so constructed that the spool becomes free for casting or paying out line, and connected to reel the line in, without loss of time or effort, and without requiring the use of a lever or the like to make the change, so that the mistake of casting or paying out line with the clutch engaged, or attempting to reel in with the spool free cannot be made.

A further object of the invention is to provide an improved free spool so constructed as to economically provide for positive driving engagement of a pawl or dog with an end portion of the spool.

A still further object of the invention is to provide an improved automatic free spool fishing reel provided with a spool which, while extremely sturdy, is relatively light in weight, and therefore avoids storing up excess energy of momentum in the spool, shaft, or other moving parts of the reel, thereby tending to eliminate backlash when casting.

Other objects and advantages of the invention will be apparent from the following detailed description, taken in connection with the accompanying drawings, forming a part of this specification and in which drawings.

Figure 1:
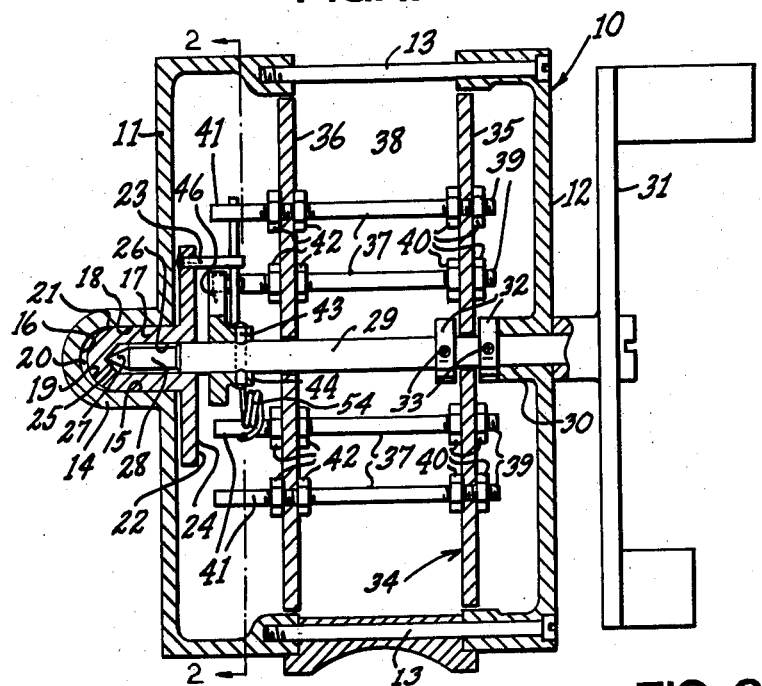
Figure 1 is a central vertical cross sectional view of a preferred form of free spool fishing reel and embodying my automatic clutch.

In the drawings wherein for the purpose of illustration are shown preferred and modified forms of the invention, 10 designates the reel frame including circular heads 11—12 secured in properly spaced apart relation as by a plurality of cap screws 13. At the center of the circular head 11 is an outwardly projecting hollow boss 14 having a cylindrical interior bearing surface 15 terminating in a substantially semi-spherical concavity 16. Within the boss 14 is a bushing 17 having a cylindrical exterior bearing surface 18, frictionally contacting the interior surface 15 of the boss, and terminating in a substantially semi-spherical convexity 19, of less longitudinal protuberance than the axial depth of the concavity 16, whereby a clearance space 20 is formed between the ends of the boss 14 and bushing 17. The clearance space 20 diminishes in width from the axes of the boss 14 and bushing 17 toward a circular or annular frictional contacting zone 21, at or adjacent the circumferential margins of the concavity 16 and the convexity 19. Preferably integral with the bushing 17 is a radial flange 22 provided with a pin 23 projecting from the inner face 24 of the flange 22 at the marginal edge thereof. Against the apex of a cone-shaped seat 25 forming the inner end of the axial bore 26 of the bushing is positioned the point 27 of the reduced end portion 28 of a drive shaft 29, freely rotatable in the bore 26 and at its opposite end portion projecting through a suitable bearing 30 in the circular head 12 and being provided with a crank 31.

Secured against movement axially of the drive shaft 29 as by collars 32 having set screws 33, is the free spool 34, comprising discs 35—36 axially mounted for free rotation on the drive shaft, and secured in spaced apart parallel relation by transverse studs or tie-rods 37 parallel to the axes of the discs and spaced a suitable distance radially outwardly of the axes of the discs and inwardly of the circumferential edges thereof, so that an annular space 38 is provided between the discs and outwardly of the tie-rods for accommodating windings of the line (not shown). Preferably, these tie-rods 37 are each threaded at one end portion 39 to take spaced-apart nuts 40 between which is secured the disc 35, and also inwardly of the opposite end portion 41 to take spaced-apart nuts 42 between which is secured the disc 36, in suitably spaced parallel relation to the flanged bushing.

Rigidly secured to the drive shaft 29 as by a rivet 43 is a sleeve 44 carrying a radial flange or plate 45 intermediate the spool and the flange 22. This plate 45 preferably is of circular outline concentric with the sleeve 44 and having a radius susbtantially equal to the distance of the pin 23 from the axis of the drive shaft 29. The marginal edge of the plate 45 may include a notch 46 accommodating the pin 23 and including a side wall 47 forming an abutment or stop for contact with the pin 23. Adjacent the opposite side wall 48 of the notch is a projecting pin 49 forming a stop for contact with a dog or pawl 50 pivoted intermediate its ends on a pin 51 rigidly carried by the plate 45 inwardly of the pin 49. One arm 52 of this pawl is connected to an end of a semi-elliptic spring 53 formed with a resilient coil 54 intermediate its ends, and having its opposite end 55 secured to the plate 45 in spaced relation to the pawl 50, so as to urge the other arm 56 of the pawl into pressing contact with the pin 23. If desired, a segment of the plate 45 adjacent the spring may be eliminated along edge 57, for counterbalancing the plate 45, and the parts attached thereto.

Figure 2:
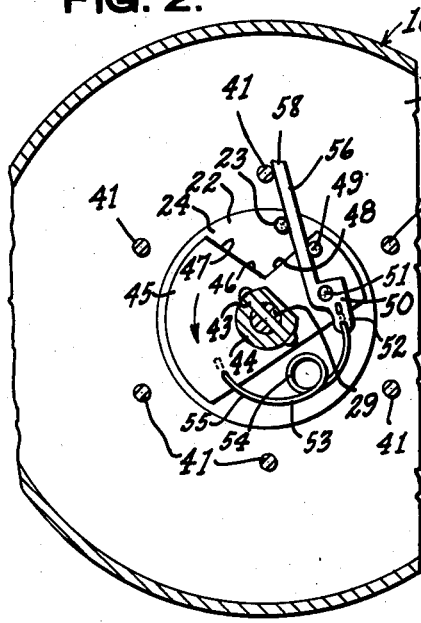
Figure 2 is a sectional view taken on the line 2—2 of Figure 1, and showing the clutch engaged.
Figure 3:
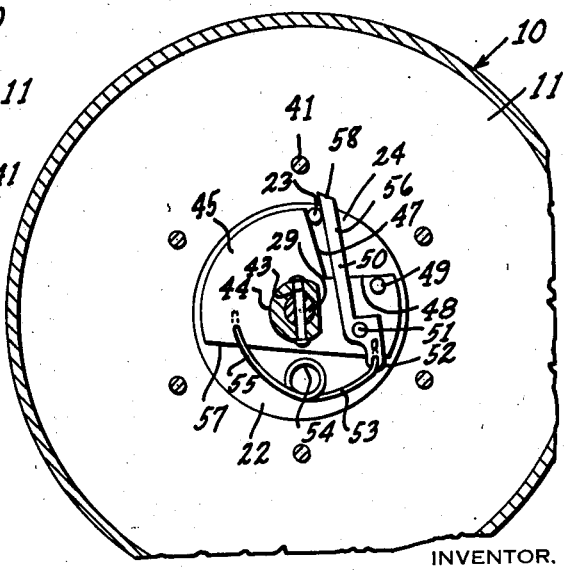
Figure 3 is a view similar to Figure 2 but showing the clutch released.

In the preferred form of invention illustrated in Figures 1–3 of the drawings, the arm 56 of the pawl may, if desired, terminate in an end portion 58 which is normally held by the spring 53 in pressing relation to the pin 23 in a manner whereby the reaction to such pressure will tend to rotate the plate in a clockwise direction until the side 47 of the notch abuts the pin 23, as shown in Figure 3. The operation of the clutch depends upon the difference in effort needed to rotate the flanged bushing 17 in the frictional bearing provided by the boss 14, and that required to compress the spring 53 until the arm 56 of the pawl rests against the pin 49. The bushing 17 fits snugly but not too tight in the boss 14, while the drive shaft 29 fits loosely in the bushing 17 except at the drive shaft point 27 where sufficient pressure is exerted endwise by the point to hold the bushing in place. When the drive shaft is rotated in a counter-clockwise direction, carrying the plate 45, and its attachments including the pin 49, pawl 50 and spring 53 therewith, the pawl arm 56 pivots outwardly due to the thrust re-action at the pin 23, and progressively compresses the spring 53, while the flange 22 and pin 23 tend to remain stationary, owing to the reluctance of the bushing 17 to rotate in the boss. Compression of the spring 53 progressively projects the pawl arm 56 outwardly until the end portion 58 rests against the pin 49, in which position it is sufficiently extended to engage one of the projecting end portions 41 of the free spool, as shown in Figure 2 of the drawings, whereupon the spool becomes positively connected to the drive shaft and turns therewith as long as the drive shaft is rotated in a counter-clockwise direction. When such rotation is discontinued, the spring 53 will expand, forcing the plate 45 and the drive shaft 29 to turn in a clockwise direction, and retracting the end portion 58 of the pawl from engaging relation with the projecting end portions 41 of the spool, so that the spool is free to turn in either direction, and returning the parts to their normal positions as shown in Figure 3.

Figure 4:
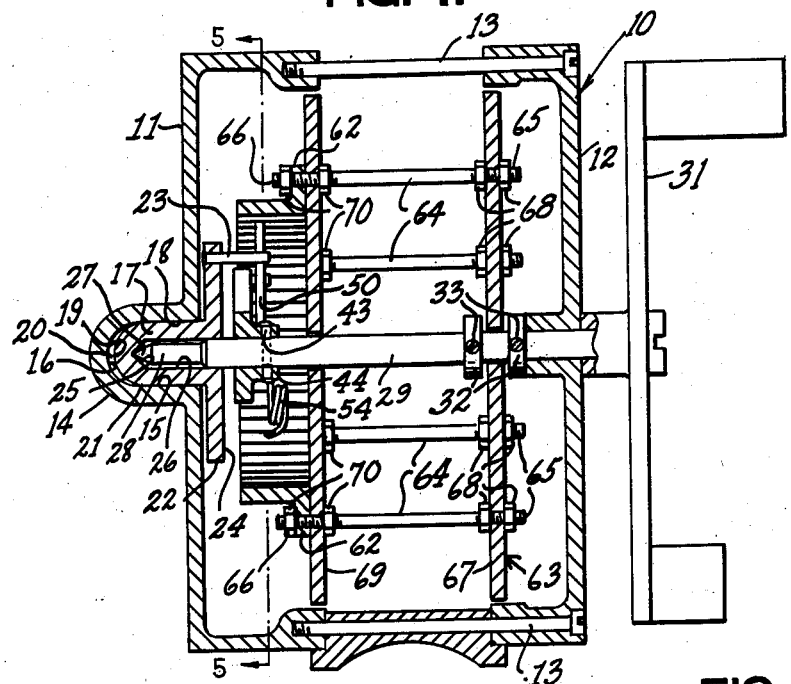
Figure 4 is a central vertical cross sectional view of a modified form of free spool fishing reel and embodying my automtic clutch.
Figure 5:
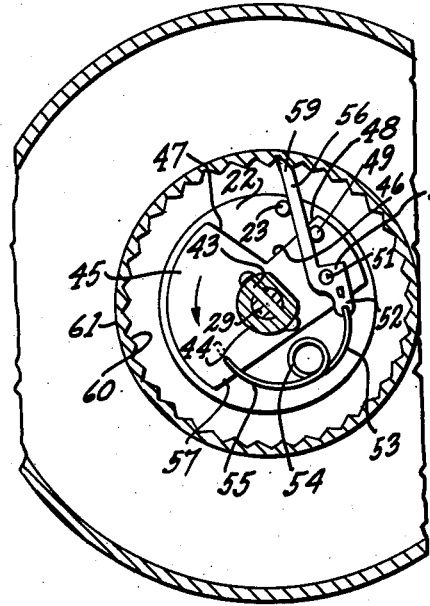
Figure 5 is a sectional view taken on the line 5—5 of Figure 4, and showing the clutch engaged.
Figure 6:
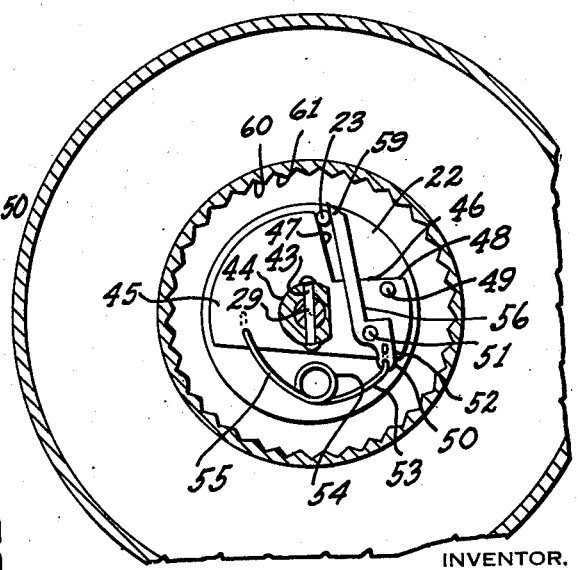
Figure 6 is a view similar to Figure 5 but showing the clutch released.

In the form of invention shown in Figures 4–6, the arm 56 of the pawl is provided with a beveled or sharpened end portion 59 for engagement with the serrated interior 60 of a cylindrical drum 61 having a radial flange 62. The spool 63 is somewhat different from the previously described spool 34, in that the tie-rods 64 are threaded at both end portions 65 and 66, the end portions 65 being secured to a disc 67 similar in function to the disc 35 of spool 34, as by spaced-apart nuts 68, and the end portions 66 extending through a disc 69, similar in function to the disc 36 of the spool 34, and also extending through the flange 62 of the serrated drum, so that by means of spaced-apart nuts 70, the drum is secured in co-axial alignment with the spool 63 at one end thereof. The other parts of the form shown in Figures 4–6 are identical with corresponding parts of the form shown in Figures 1–3, and have like reference characters. This form of invention operates satisfactorily where the additional weight of the serrated drum or ring is not objectionable. The operation of the clutch with the serrated drum 61 is the same as with the annular series of projections 41 of the preferred form of invention in that the arm 56 of the pawl is projected outwardly into engagement by counterclockwise rotation of the drive shaft, but is different from the preferred form in that the end portion 59 of the pawl is preferably so proportioned as to come into contact with the serrated interior 60 of the drum before the back of the pawl 50 strikes the pin 49, thus allowing an outward pressure to be exerted against the interior of the drum by the pawl 50, as long as the drive-shaft is rotated in a counter-clockwise direction to turn the spool.

Various changes in the shape, size and arrangement of parts may be made to the forms of the invention herein shown and described, without departing from the spirit of the invention or the scope of the following claims.

I claim:

1. A free spool fishing reel including a frame, a drive shaft journaled in the frame, a free spool on the drive shaft, including a pair of discs coaxial with the drive shaft, forming side walls of the spool, and a plurality of rods parallel to and equidistant from the drive shaft, securing the discs in spaced relation and forming a support for windings on the spool, said rods including projecting portions at one end of the spool, a driving member fixed to the drive shaft, a dog pivoted to the driving member, and swingable into and out of position for engagement with one of said projecting portions, means urging said dog out of said position, and means operable upon rotation of said drive shaft to swing the dog into said position.

2. A clutch including a stationary housing having a bearing, a bushing mounted for frictional rotation in the bearing, a rotatable shaft carried by the housing in co-axial alignment with the bushing, a driving member fixed to the shaft, a driven member rotatable on the shaft, a dog pivoted to and rotatable with the driving member and movable into and out of engagement with the driven member, a spring urging the dog out of such engagement, and an abutment carried by the bushing in the path of rotation of the dog for moving the dog into such engagement upon relative rotation of the drive shaft and the bushing.

3. A clutch including a frame provided with a bearing, a bushing frictionally rotatable in the bearing, a shaft rotatable in the bushing, a driving member fixed to the shaft, a driven member rotatable on the shaft, a dog pivoted to and rotatable with the driving member and swingable into and out of engagement with the driven member, a spring carried by the driving member urging the dog out of engagement with the driven member, and an abutment so carried by the bushing that, upon relative rotation of the drive shaft and the bushing, the dog will swing into engagement with the driven member, through contact with the abutment.

4. A free spool fishing reel including a frame, a drive shaft journaled in the frame; a free spool on the drive shaft, including a pair of discs co-axial with the drive shaft and forming side walls of the spool, and a plurality of rods parallel to and equidistant from the driveshaft, securing the discs in spaced relation and forming a support for windings on the spool, said rods including projecting portions at one end of the spool, a cylindrical drum having an annular attaching flange fixed to the end of the spool by said projecting portions, a driving member fixed to the drive shaft within the drum, a dog pivoted to the driving member and swingable into and out of engagement with the interior of said drum, a spring carried by the driving member and urging the dog out of said engagement, and means operable upon rotation of the drive shaft to swing the dog into engagement with the interior of said drum.

5. A device of the class described including a frame, a drive shaft rotatably carried by the frame, a member freely rotatable on the drive shaft, a fixed member secured to the drive shaft for rotation therewith, a dog pivoted to the fixed member and swingable into and out of engagement with the freely rotatable member, means urging the dog out of engagement with the freely rotatable member, means responsive to rotation of the drive shaft to swing the dog into engagement with the rotatable member, and an abutment on the fixed member so arranged as to stop further pivotal movement of the dog beyond its engaged position, and thereupon additionally functioning to directly transmit movement of said fixed member due to said rotation of the drive shaft bodily to said dog in its engaged position.

6. A free spool fishing reel including a frame, a bushing mounted for reluctant rotation in the frame and having a flange provided with a stop pin, a drive shaft freely rotatable in the bushing, a spool freely rotatable on the drive shaft, a plate fixed to the drive shaft, a dog pivoted to the plate and swingable into and out of engagement with the spool, a stop pin fixed to the plate arranged to limit swinging movement of the dog beyond its position of engagement with the spool, and a spring carried by the plate and urging the dog out of engagement with the spool, the stop pin of said bushing flange being positioned to contact the dog upon turning of the drive shaft relative to the bushing, and cause the dog to swing into engagement with the spool.

FOSTER H. WETMORE.